Patented Jan. 25, 1938

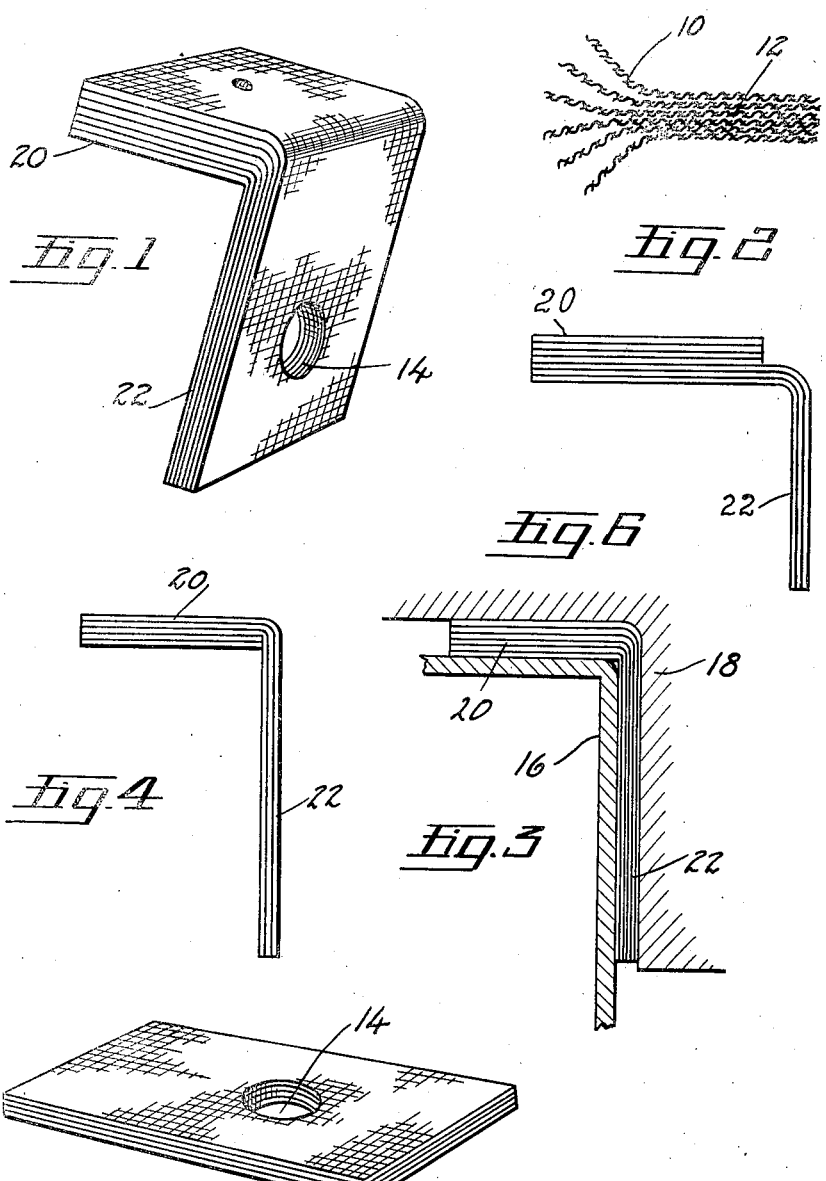

2,106,385

UNITED STATES PATENT OFFICE 2,106,385

SHIM STRUCTURE

Ray W. Springer, Detroit, Mich.

Application February 28, 1936, Serial No. 66,155

3 Claims. (Cl. 154—43)

My invention relates to improvements in shims or the like and particularly to an improved shim formed of moisture resistant compressible sound insulating anti-squeak material made up of a plurality of laminations into an improved unitary structure.

An important characteristic of my improved shim is that it is formed from a plurality of superimposed layers of loosely woven fibrous material impregnated with a latex binder and compacted together to adhesively form a unitary structure wherein the binder performs the additional function of rendering the shim compressible, non-absorbent and moisture resistant and preserves the fibrous layers from deterioration. My improved shim is tough, strong, flexible, weather resistant and non-absorbent to dirt, grease, moisture or the like. It is inexpensive to manufacture and possesses long life.

An object of one preferred embodiment of my invention is to provide a shim of the character described which comprises two portions, one of which possesses a thickness and compressibility greater than that of the other portion even though both portions may or may not possess the same number of laminations.

In one embodiment of my invention the shim is permanently tacky whereby the several layers which make up the shim are not only resiliently adhesively held together by the latex with which they are impregnated but will, upon being brought together under pressure following separation of the layers, adhesively reunite to form an integral structure. Furthermore, the shim tends to adhere to the structural parts between which it is disposed and compressed to form a moisture resistant sealed joint or bond between said parts. This joint or bond gives upon relative movement of the structural parts to accommodate such movement while at all times maintaining its moisture resistant seal throughout and against said parts.

Other objects, advantages, and meritorious features will more fully appear from the following description, appended claims, and accompanying drawing, wherein:

Figure 1 is a perspective of a shim embodying my invention,

Fig. 2 is an elevation of a shim with the several laminations separated,

Fig. 3 is an elevation of the shim of Fig. 1 in position and in use,

Fig. 4 illustrates a modified form of my improved shim,

Fig. 5 illustrates a second modified form, and

Fig. 6 is an alternate form of Fig. 4.

My improved shim structure is preferably made up of a plurality of layers 10 of coarse fibrous loosely woven material such as burlap. These layers are thoroughly impregnated with a suitable latex compound. The several layers thus impregnated are arranged in superimposed relationship and compressed together. The degree of compression depends upon the degree of density desired in the resulting structure. In any event, the layers are compressed so that the latex is forced intimately into the porosities of the several layers forming a continuous connective resilient binder body extending throughout the several layers bonding them securely together and rendering them moisture resistant. Not only is the entire structure made resistant to moisture, dirt, grease, or the like, but the individual woven strands are likewise so characterized. The latex solution extends continuously over the exterior surfaces of the compacted structure forming a moisture resistant film thereover and it extends continuously throughout the interior of the structure preserving and protecting the fibers thereof, rendering the same non-absorbent, yielding, and moisture resistant.

The structure is compressible so that as a shim it may yield between two structural members arranged upon opposite sides thereof to take up any irregularities of said members and to form a yielding sound insulating anti-squeak shim therebetween. Suitable apertures for the passage of bolts or other fastening means extending between the two members may be provided and are indicated in the drawing at 14.

By "latex" or "latex compound" I mean a water emulsion of rubber which comprises the natural product, latex, modifications or compounds thereof, or artificial aqueous dispersions of rubber. For some purposes it is desirable to have a vulcanized shim and in such cases the latex compound may comprise the following ingredients in volume units of measurement:

| | |
|---|---|
| Rubber latex | 100 |
| Zinc oxide | 2 |
| Colloidal sulphur | 1 |
| Antioxidant (as agerite white) | 1 |
| Accelerator (as butylzymate) | 1 |
| Telloy | .5 |
| Stabilizer (as casein) | 2 |
| Potassum hydroxide | .5 |

Parts plus water as desired 108

The above formula is merely illustrative and substitutions and modifications of ingredients and variations in amounts of ingredients as well known to those familiar with the compounding of latex adhesive, may be made. Following the fabrication of such a shim it is passed through a vulcanizing chamber.

For other purposes it is desirable to have an unvulcanized shim. In such case the latex compound may comprise 50 c. c. m. of rubber latex, 4 to 6 c. c. m. of saturated Burgundy pitch solution, and 20 drops of Neozone L. The pitch solution is a solution formed of Burgundy pitch in a suitable solvent wherein the pitch is dissolved to the maximum capacity of the solvent. The Neozone L. (a commercial product) is an anti-oxidant and other similar suitable anti-oxidants might be used. Such a latex compound possesses a normally permanently tacky character and the pitch tends to increase this factor. A suitable dye may be added to the latex compound in each case if desired.

In Fig. 5, I have indicated a flat shim made up of a plurality of the layers described, impregnated as set forth and compressed together forming an integral structure which is adapted for use in any place wherein a flat shim of this character is suitable.

In Figs. 1, 3 and 6, I have indicated a structure of angular shape wherein the shape is such that the shim may be received between angular members as might be the case in automobile construction of a shim used between the body and chassis frame. The cross-sectional view of Fig. 3 is illustrative. In this view a chassis frame element is indicated as 16 and a body sill member as 18. This particular shim is formed, as shown in Figs. 1 and 3, of a number of layers of impregnated fabric material compressed together. The compression is so exerted as to shape the structure into the angular form shown. It is also so exerted that the portion 20 of the shim is compacted substantially less and retains a greater thickness than the portion 22. The same number of layers is employed throughout. In the finished shim the compressibility of the portion 20 is substantially greater than that of portion 22 so that it will form a more resilient cushion portion than 22. This is particularly desirable in some types of shims and this particular method of providing such a shim and the form here illustrated exhibits a vast saving over the conventional form of molded shim which is expensive.

The same result may be achieved in another manner as shown in Fig. 4 or Fig. 6 where the portion 20 is built up of a greater number of layers than is the portion 22. In the construction of Figs. 4 and 6 the layers are impregnated as has been described and are subjected to pressure so that they are securely bonded together by the latex binder without the employment of any other connecting means such as stitching or the like as is also the case in connection with the structure shown in the other figures of the drawing.

When the shim is inserted in place as shown in Fig. 3 it is compressible to accommodate itself to the irregularities of the structural parts between which it is disposed. It is resistant to the ingress of moisture, dirt, grease, or the like forming a sealed joint between the structural parts. It forms an anti-squeak support and it is durable, flexible, and of long life.

In the unvulcanized shim its relatively permanently tacky character causes it, upon being subjected to pressure between the adjacent structural parts, to tend to adhesively engage such parts and to form a moisture resistant seal thereagainst, which effectively seals the joint between the shim and adjacent structural parts against ingress of dirt, moisture, or the like. Its permanent resilient and tacky character causes the shim to continue to effectively perform this function of sealing notwithstanding relative movement of the structural parts which may occur in use.

Its permanently tacky characteristic causes the several layers which make up the shim to reunite and bond themselves securely together as an integral structure following a separation of the layers resulting from any cause whatsoever. The shim is therefore self-sealing.

By relatively permanently tacky is meant that characteristic of the material which causes successive impregnated fibrous layers of the material to re-unite or re-bond themselves together upon being compressed together following separation of said layers. It is not tacky in the sense of sticking securely or bonding itself to the fingers of the person picking up such shim.

What I claim:

1. A shim comprising two angularly disposed portions and formed of a plurality of superimposed layers of woven fibrous material adhesively secured together by a moisture resistant compressible binder of rubber deposited from latex, each layer extending throughout the entire area of both angularly disposed portions of the shim and impregnated with said binder rendering the layer and the individual fibers thereof moisture resistant and relatively permanently tacky, said layers being compacted together and adhesively secured together by said binder, said shim having the layers in one angularly disposed portion compacted to a less thickness and greater density than in the other angularly disposed portion.

2. A load carrying shim consisting of a plurality of superimposed layers of relatively coarse woven fibrous material individually impregnated with rubber deposited from latex of a character rendering each layer relatively permanently tacky, said superimposed layers being compressed so that the latex is forced intimately into the porosities of the several layers forming a continuous connective resilient binder body extending throughout the several layers and bonding them securely together.

3. A load carrying shim having two angularly disposed portions and consisting of a plurality of superimposed layers of relatively coarse woven fibrous material individually impregnated with rubber deposited from latex of a character rendering each layer relatively permanently tacky, said superimposed layers being compressed so that the latex is forced intimately into the porosities of the several layers forming a continuous connective resilient binder body extending throughout the several layers and bonding them securely together, said shim having one angularly disposed portion throughout which the layers are compacted to a greater density and less thickness than elsewhere.

RAY W. SPRINGER.